(12) United States Patent
Horovitz et al.

(10) Patent No.: US 8,271,450 B2
(45) Date of Patent: Sep. 18, 2012

(54) MONITORING A DATA STRUCTURE IN A VIRTUAL MACHINE AND DETERMINING IF MEMORY PAGES CONTAINING THE DATA STRUCTURE ARE SWAPPED INTO OR OUT OF GUEST PHYSICAL MEMORY

(75) Inventors: Oded Horovitz, Palo Alto, CA (US); Ophir Rachman, Sunnyvale, CA (US); Wei Xu, Sunnyvale, CA (US); Adrian Drzewiecki, Los Altos, CA (US); Xiaoxin Chen, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 238 days.

(21) Appl. No.: 12/572,158

(22) Filed: Oct. 1, 2009

(65) Prior Publication Data

US 2011/0082962 A1  Apr. 7, 2011

(51) Int. Cl.
*G06F 7/00* (2006.01)
*G06F 17/00* (2006.01)

(52) U.S. Cl. ............ 707/661; 711/6; 711/162; 711/165; 718/1; 726/22

(58) Field of Classification Search ........ 718/1; 726/22; 711/6, 162, 165; 707/661
See application file for complete search history.

(56) References Cited

U.S. PATENT DOCUMENTS

| | | | | |
|---|---|---|---|---|
| 7,313,669 B2 * | 12/2007 | Neiger et al. | ................. | 711/207 |
| 2005/0204357 A1 * | 9/2005 | Garg et al. | ........................ | 718/1 |
| 2006/0010440 A1 * | 1/2006 | Anderson et al. | .................. | 718/1 |
| 2006/0161719 A1 * | 7/2006 | Bennett et al. | ..................... | 711/6 |
| 2009/0007107 A1 * | 1/2009 | Taillefer et al. | ..................... | 718/1 |
| 2009/0055571 A1 * | 2/2009 | Budko et al. | ...................... | 711/6 |
| 2009/0055693 A1 * | 2/2009 | Budko et al. | ..................... | 714/57 |

\* cited by examiner

*Primary Examiner* — Hong Kim

(57) ABSTRACT

A method for monitoring a data structure maintained by guest software within a virtual machine is disclosed. Changes to the contents of the data structure are determined, such as by placing write traces on the memory pages containing the data structure. Also, the method involves determining when memory pages containing the data structure are swapped into and/or out of guest physical memory by the guest software, such as by placing write traces on the memory pages containing the guest page table and detecting changes to the present bit of page table entries involved in mapping virtual addresses for the data structure. Information about the contents of the data structure is retained while memory pages containing the data structure are swapped out of guest physical memory.

21 Claims, 10 Drawing Sheets

Flowchart 6000

Flowchart 6500

Flowchart 8000

MONITORING A DATA STRUCTURE IN A VIRTUAL MACHINE AND DETERMINING IF MEMORY PAGES CONTAINING THE DATA STRUCTURE ARE SWAPPED INTO OR OUT OF GUEST PHYSICAL MEMORY

BACKGROUND

1. Field of the Invention

Embodiments of the present invention pertain to monitoring data structures inside a virtual machine.

2. Related Art

Embodiments of this invention can be implemented in a wide variety of virtualized computer systems. Many such virtualized computer systems are described in the prior art. In particular, though not exclusively, embodiments of this invention can be implemented in virtualized computer systems that have been described in prior patents and applications originally assigned to VMware, Inc. ("VMware"), the original assignee of this patent, along with other published documents from VMware. Thus, for example, embodiments of this invention may be implemented in "hosted" virtualized computer systems and in "non-hosted" or "kernel-based" virtualized computer systems, as those terms are used in prior patents and applications originally assigned to VMware. Embodiments of this invention may also be implemented in virtualized computer systems having varying "degrees of virtualization," including "para-virtualized" computer systems, as those terms are used in prior patents and applications originally assigned to VMware. Embodiments of the invention may also be implemented in computer systems having a wide variety of physical hardware platforms and configurations, as well as a wide variety of system software platforms and configurations.

FIG. 1 shows one possible arrangement of computer system 700 that implements virtualization. A virtual machine (VM) or "guest" 200 is installed on a "host platform," or simply "host," which includes system hardware, that is, hardware platform 100 of computer system 700, and one or more layers or co-resident components comprising system-level software, such as an operating system or similar kernel, or a virtual machine monitor or hypervisor, or some combination of these. The system hardware typically includes one or more processors 110, memory 130, some form of mass storage 140, and various other devices 170. Additionally, an operating system, such as Console Operating System 420, and hosted application(s) 430 are shown with an optional coupling to system hardware 100.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of VM 200 may be implemented in software using known techniques to emulate the corresponding physical components. Guest system software 202 includes guest operating system (OS) 220 and drivers 224 as needed for various virtual devices 270. One or more guest applications 260 may run on the guest OS 220 in the VM 200.

Some interface is generally required between the guest software within VM 200 and the various hardware components and devices in underlying hardware platform 100. This interface—which may be referred to generally as "virtualization software"—may include one or more software components and/or layers, possibly including one or more of the software components known in the field of virtual machine technology as "virtual machine monitors" (VMMs) 300, . . . , 300-*n*, "hypervisors," or virtualization "kernels" 600. The interface between the guest software and the hardware platform may alternatively be referred to as "virtualization logic" to include the possibility that some virtualization functionality may be implemented in hardware or firmware. The description below is generally made in terms of "virtualization software," however, except as specifically noted below, the invention may also be implemented in systems in which some virtualization functionality is implemented in hardware and/or firmware.

Virtual Addressing

A traditional method used in computer resource management is virtual memory allocation. Essentially, the use of virtual memory allows an operating system to allocate memory to every program or process running on top of the operating system, so as to simplify memory management within programs. Often, the operating system can allocate more virtual memory than the system has real memory, as it is unlikely that every process or application will be running simultaneously; as such, not all virtual memory will need to be backed by physical memory. To "stretch" the available physical memory in this way, swapping is used to move inactive pages of memory to other storage devices, e.g., a hard drive, to free up physical memory for an active process.

One method of managing virtual memory and a corresponding virtual address space is to use page tables. A page table is a data structure used by a virtual memory system to store a mapping between virtual addresses and physical addresses.

In virtual machines, virtual memory allocation is similar to that described above, but with an additional layer of complexity. For example, a host machine has a defined amount of machine memory available. In a virtualization system, a certain amount of "physical memory" is provided for each virtual machine. As with virtual memory, more physical memory may be provided to virtual machines than there is machine memory available. Analogous to an operating system in a physical computer system, a hypervisor or other virtualization software may use a storage device to back data that is swapped out of machine memory, giving the impression that each virtual machine actually has the physical memory that it has been provided. The guest operating system executing on the virtual machine will then allocate virtual memory to the various processes that are executing on that virtual machine.

There are various reasons why it may be advantageous to monitor certain data structures within a virtual machine. For example, there are various reasons why it may be useful to monitor a process list maintained by an operating system executing within a virtual machine. Monitoring a data structure in a virtual machine is made more challenging, however, because utilization and manipulation of memory by most operating systems is an internal process for the operating system that is not designed to be transparent. The "black box" nature of virtual memory management in most operating systems often makes it difficult to determine the contents of pages in the virtual address space utilized by any given process executing on a virtual machine. For example, at any given time, various pages in the virtual address space may be swapped out to disk, and it is almost impossible to estimate how the guest operating system will choose to swap pages in and out of physical memory.

SUMMARY

Embodiments of the present invention allow for monitoring of data structures within a virtual machine. Changes to the data structure itself are monitored. For example, in some embodiments, write traces are placed on the memory page(s) containing the data structure to detect attempts to write to the data structure. In addition, changes to page tables that may affect the data structure are also monitored. For example, in some embodiments, write traces are placed on memory page(s) containing page table(s) for which changes may affect the data structure. For example, if a memory page contains a guest page table page that maps virtual addresses for the data structure, a write trace may be placed on that memory page, so that, if a guest operating system attempts to swap out another memory page containing all or part of the data structure an attempt to write to the guest page table entry for the memory page to be swapped out can be detected. Monitoring changes made to the data structure and to relevant page table entries allows for monitoring a data structure in a virtual address space in a virtual machine, even as memory page(s) containing the data structure are swapped in and out of physical memory.

In some embodiments of the invention, a virtual machine can suspend operations, and all or part of the virtual address space utilized by the virtual machine can be examined. This allows for activities such as antivirus or anti-malware scanning to be performed from outside the virtual machine. Consequently, even if the virtual machine were to be compromised, a security product running within another virtual machine could be utilized to detect and correct problems.

In other embodiments, these techniques can be adapted to allow for virtual address space monitoring while a virtual machine is running. This method allows system call interception and monitoring, for example. If an application sets up the arguments for a system call, and is preempted and the memory corresponding to the system call is swapped out, this method allows a system call monitor to capture those arguments for examination, even though they no longer reside in memory.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION

Figure 1:
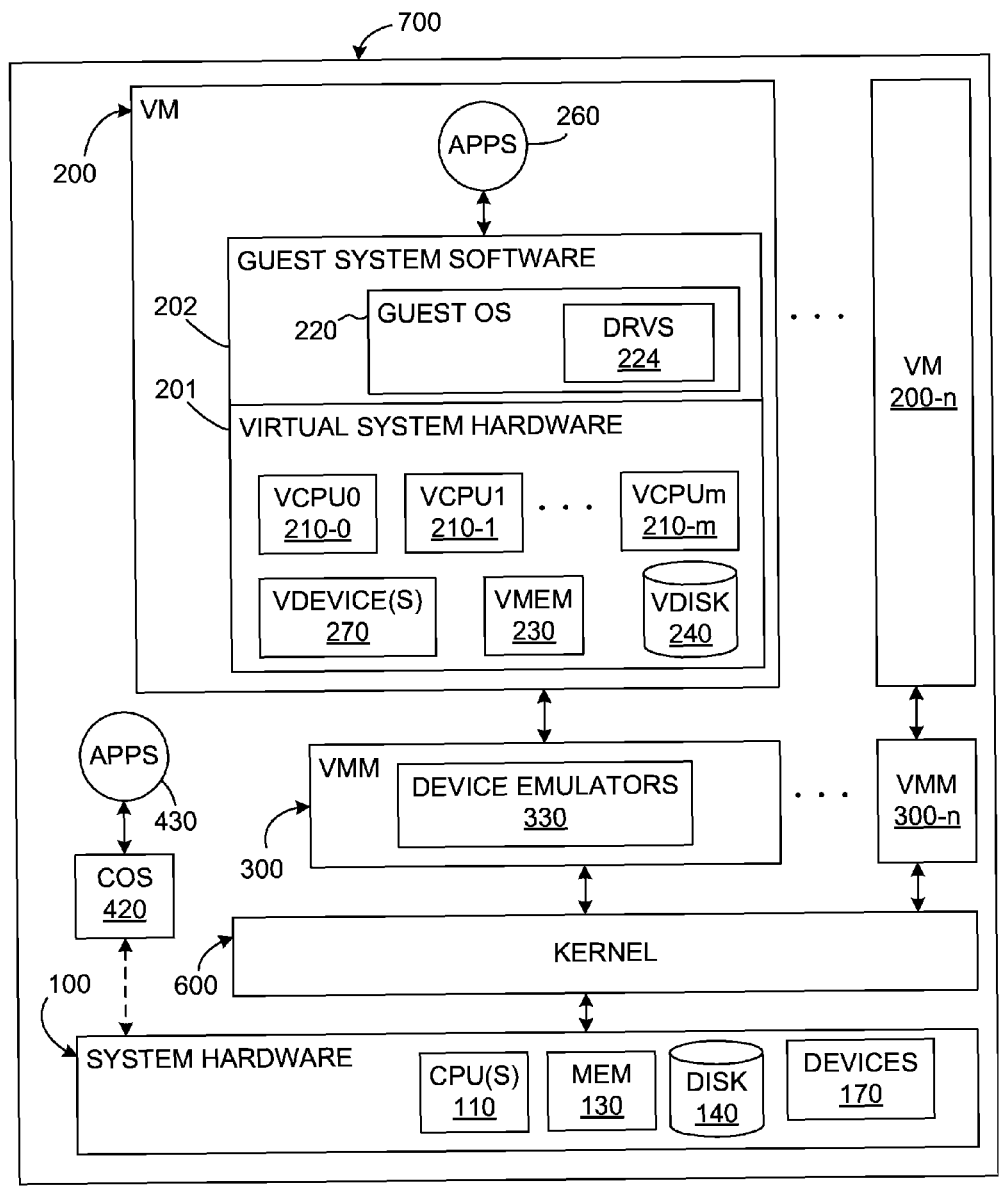
FIG. 1 is a diagram of an exemplary virtualized computer system with which embodiments of the present technology may be practiced.

Reference will now be made to several embodiments. While the subject matter will be described in conjunction with these embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous details are set forth to provide an understanding of the claimed subject matter. However, it will be recognized by one skilled in the art that embodiments may be practiced without these details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing operations of the method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present description, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Moreover, computer storage media may be accessed over a communications or network connection, such as is common in network attached storage (NAS) or storage area network (SAN) solutions.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

It is understood that the following embodiments are exemplary in nature. Embodiments of the present invention are well suited to application across a wide range of computers, virtual systems, networks, and storage protocols. Embodiments of the present invention may be used in both hosted and non-hosted virtualized computer systems, and regardless of the degree of virtualization and the systems. Embodiments may be used in applications in which the virtual machines have any number of physical and/or logical virtualized processors. Embodiments of the present invention may be implemented in numerous locations, including as part of a computer system's primary operating system, both where the OS is designed to support virtual machines, and where it is not. Additionally, embodiments of the present invention may be implemented in software, in hardware, in firmware, or in some combination thereof, e.g., in processor architectures intended to provide hardware support for virtual machines.

Virtual Address Space Monitoring

Embodiments of the present invention allow for monitoring of data structures within a virtual machine. Changes to the data structure itself are monitored. For example, in some embodiments, write traces are placed on the memory page(s) containing the data structure to detect attempts to write to the data structure. In addition, changes to page tables that may affect the data structure are also monitored. For example, in some embodiments, write traces are placed on memory page(s) containing page table(s) for which changes may affect the data structure. For example, if a memory page contains a guest page table page that maps virtual addresses for the data structure, a write trace may be placed on that memory page, so that, if a guest operating system attempts to swap out another memory page containing all or part of the data structure an attempt to write to the guest page table entry for the memory page to be swapped out can be detected. Monitoring changes made to the data structure and to relevant page table entries allows for monitoring a data structure in a virtual address space in a virtual machine, even as memory page(s) containing the data structure are swapped in and out of physical memory.

In some embodiments of the invention, a virtual machine can suspend operations, and all or part of the virtual address space utilized by the virtual machine can be examined. This allows for activities such as antivirus or anti-malware scanning to be performed from outside the virtual machine. Consequently, even if the virtual machine were to be compromised, a security product running within another virtual machine could be utilized to detect and correct problems.

In other embodiments, these techniques can be adapted to allow for virtual address space monitoring while a virtual machine is running. This method allows system call interception and monitoring, for example. If an application sets up the arguments for a system call, and is preempted and the memory corresponding to the system call is swapped out, this method allows a system call monitor to capture those arguments for examination, even though they no longer reside in memory.

Linear Tracing

In the description that follows, exemplary embodiments are presented, which utilize page tables and shadow page tables. Embodiments monitor changes to a data structure of interest in a virtual address space in a virtual machine, as well as changes to page tables for the virtual address space that could affect the data structure. For example, swapping a memory page containing all or part of the monitored data structure in or out of memory can affect the availability of the data structure. It is understood that these embodiments may entail monitoring changes within multiple related page tables.

Figure 2:
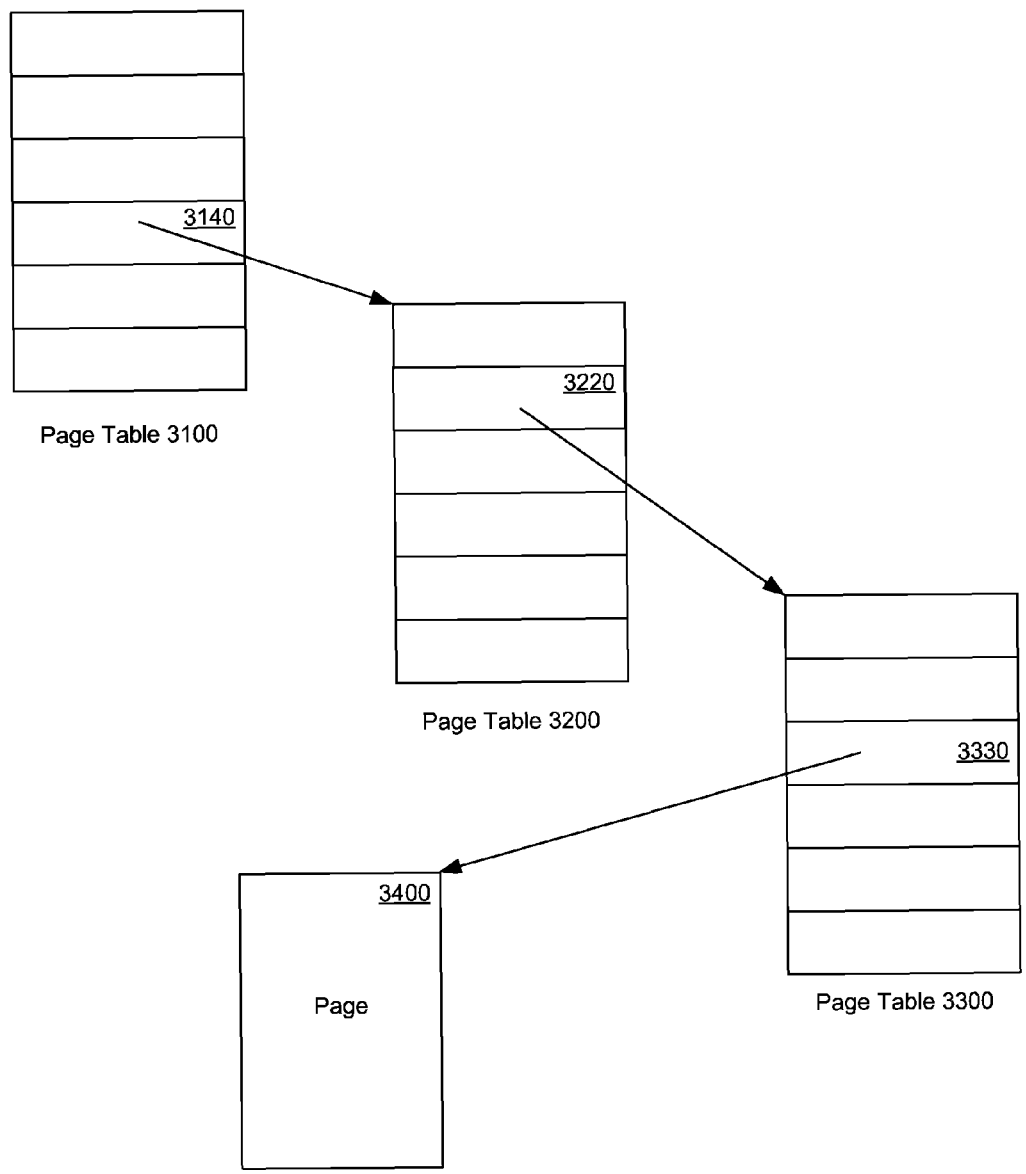
FIG. 2 depicts a hierarchy of page tables, in accordance with one embodiment.

For example, with reference to FIG. 2, page table 3100 includes entry 3140. A memory location corresponding to entry 3140 contains page table 3200. Page table 3200 includes entry 3220, and a memory location corresponding to entry 3220 includes page table 3300. Page table 3300 includes entry 3330, which indicates the location of page 3400 in memory. Therefore, to monitor changes occurring in page table 3300 or on page 3400, changes which affect the earlier page tables may also be monitored. The term "linear tracing" is used herein to describe monitoring multiple locations or page tables, to detect changes affecting a monitored or flagged item.

For example, linear tracing performed with reference to page 3400 would monitor entry 3330, e.g., to determine if page 3400 was swapped out. Entry 3220 would also be monitored, to determine if page table 3300 was swapped out or modified. Similarly, entry 3140 will be monitored, to determine if page table 3200 was swapped out or modified. If page table 3100 is not the highest level page table for the operating system, additional monitoring may be necessary to ensure that page 3400 is not indirectly modified or affected by some action taken upon a page table even further up the hierarchy.

Shadowing Data Structures in Virtualized Environments

One useful technique for virtualization involves the creation of shadow data structures, which mirror the state of a data structure within a virtual machine. As changes are made to the data structure by the guest OS or other guest software executing within the virtual machine, the virtualization software, e.g., a virtual machine monitor (VMM), updates the shadow data structure to reflect the changed state. The shadowing of data structures is already used in various virtualized computer systems. For example, shadow page tables, which mirror the state of page tables generated by the guest OS in a VM, have been thoroughly described in the prior art. In embodiments of this invention, shadowing may also be used for monitoring data structures in a virtual machine, where the shadowing is not performed for the basic purpose of supporting the operation of the virtual machine, as in the case of shadow page tables.

One approach to the creation and maintenance of a shadow data structure involves placing a "write trace" on the primary structure. The write trace provides notification to the VMM whenever the guest attempts to modify the primary structure. This in turn gives the VMM the opportunity to control the modification to the primary structure, and rederive the shadow structure from the primary. In other situations, primarily involving memory-mapped devices, the VMM may use "read traces" to get notification whenever the guest reads a memory location. This approach is described in greater detail in U.S. Pat. No. 6,961,806, System and method for detecting access to shared structures and for maintaining coherence of derived structures in virtualized multiprocessor systems, by Agesen et al., which is incorporated herein by reference.

Virtual Address Space and the Shadow Page Table

As discussed previously, page tables allow for translation between virtual address space assigned to a particular process or program, and physical address space available in physical memory. Shadow page tables are utilized to translate between the guest virtual address space allocated by an operating system executing in a virtual machine, and physical address space available on the host system. In the following discussion, "guest virtual address space" (or just "virtual address space") is used to refer to the virtual address space allocated by the guest OS; "guest physical address space" refers to the memory allocated to a virtual machine, e.g., by a hypervisor; and "physical address space" (or "machine address space") refers to the host system's underlying hardware resources.

Generally, each process or application executing on a virtual machine will have its own page table (or set of page tables), although some processes may share page tables, e.g., pages for the guest operating system will often be repeated across page tables for different processes. These page tables are maintained by the guest operating system within the virtual machine, and the guest operating system will update these tables as needed. For example, the guest operating system swaps pages in and out of guest physical memory and also performs context switches between multiple page tables. Of particular relevance to this description, the page tables maintained by the guest OS typically include entries that map certain virtual addresses to the page tables themselves. The guest OS then uses these virtual addresses when updating the page tables. Meanwhile, the virtualization software or the virtual machine monitor, generally creates a shadow page table for each "guest" page table created by the guest operating system, with each shadow page table generally including an entry corresponding to each entry in the corresponding guest page table. These shadow page tables are updated and modified as the guest page tables within the guest operating system are changed. Manipulation of physical memory is performed according to entries in the active shadow page table. Under some architectures, the machine CPU includes a page table base register (PTBR), which stores a reference to the current shadow page table.

Figure 3A:
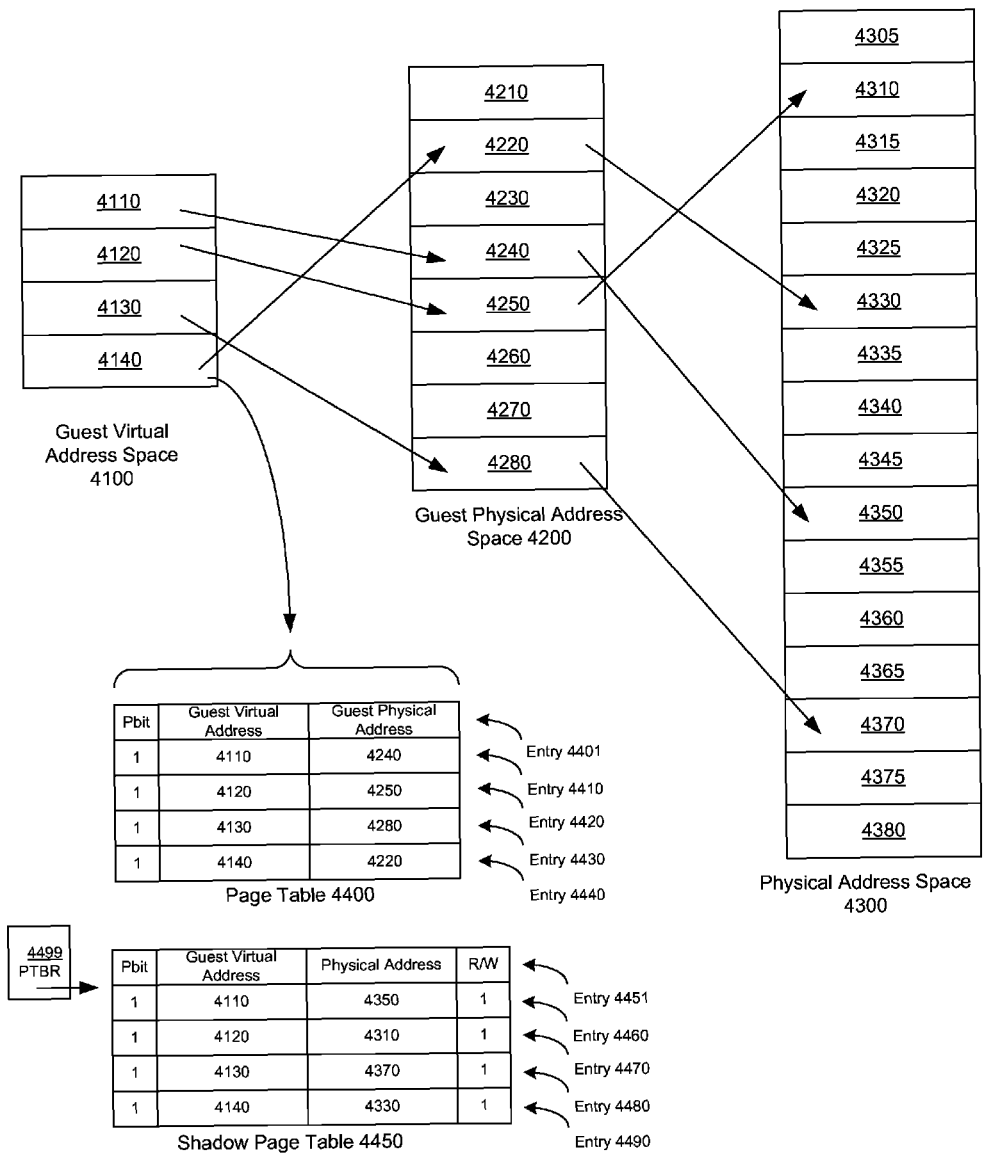
FIG. 3a depicts an exemplary mapping of virtual address space to physical address space, in accordance with one embodiment.

With reference to FIG. 3a, an exemplary mapping of guest virtual address space to physical address space is depicted, in accordance with one embodiment. It is understood that while FIG. 3a describes certain specific, enumerated features, elements, and arrangements, embodiments are well suited to applications involving additional, fewer, or different features, elements, or arrangements. In particular, it is understood that page table and shadow page table entries may conform to a wide variety of formats, and include many different types of information, such as "dirty" bits, which indicate when the contents of a page have been altered; address space or process ID information, which indicate the process or program associated with the contents of a page; present bits, which indicate if the page is presently in memory; etc.

In the depicted embodiment, guest virtual address space 4100 consists of four pages of memory, e.g., pages 4110, 4120, 4130, and 4140. Guest virtual address space 4100 represents virtual memory addresses that are mapped by a guest page table associated with a process executing on a virtual machine, including virtual memory allocated to the process. In one embodiment this virtual memory is assigned to the process by the guest operating system for that VM. Guest virtual address space 4100 generally also includes memory pages that are only accessible by kernel code in the guest operating system.

Guest physical address space 4200 is depicted as including eight pages of memory 4210-4280. The virtualization software running on the host system allocates guest physical memory to a VM; the VM uses this allocated guest physical memory as guest physical address space 4200. Guest virtual address space 4100 is mapped into guest physical address space 4200, in accordance with page table 4400.

As indicated by entry 4401, each entry in page table 4400 includes a present bit (Pbit), a virtual address, and a corresponding physical address. The present bit indicates whether a page corresponding to the virtual address is currently present in guest physical memory. Entries 4410 through 4440 indicate translations between guest virtual address space 4100 and guest physical address space 4200. In this example, all pages in guest virtual address space 4100 are present in guest physical address space 4200, at the locations given in page table 4400 (and as indicated by the arrows between guest virtual address space 4100 and guest physical address space 4200). Also in this example, page table 4400 resides in virtual memory page 4140, which is mapped to guest physical memory page 4220 by entry 4440 of guest page table 4400. Thus, to access the page table 4400, the guest OS uses virtual addresses that fall within virtual memory page 4140, and entry 4440 maps these virtual addresses into guest physical memory page 4220.

Physical address space 4300 is depicted as including 16 pages 4305-4380 of memory. Physical address space 4300 represents the physical or machine memory available to the host system. Guest virtual address space 4100 is mapped into physical address space 4300, in accordance with shadow page table 4450.

As indicated by entry 4451, each entry in shadow page table 4450 includes a present bit (Pbit), a virtual guest address, and a corresponding physical address. The present bit indicates whether the page corresponding to the virtual guest address is currently present in physical memory. Entries 4460 through 4490 indicate translations between guest virtual address space 4100 and physical address space 4300. In this example, each of the pages indicated in shadow page table 4450 are currently present in physical address space 4300. Entry 4490 of shadow page table 4450 maps virtual memory page 4140, which contains guest page table 4400, to physical memory page 4330.

In the depicted embodiment, each entry in shadow page table 4450 also includes a read/write flag. As described in greater detail below, manipulation of the read/write flag in the shadow page table allows for detecting modifications to the guest page table and to the guest virtual address space mapped by the guest page table. In the depicted embodiment, the numeral 1 is used to indicate that a particular entry in the shadow page table is unprotected. This indicates that the particular entry can be modified.

FIG. 3a also shows page table base register (PTBR) 4499. CPU 110 within the host system includes a page table base register to serve as a pointer to the active page table. As such, when the application associated with a virtual address space 4100 is executing, PTBR 4499 points to shadow page table 4450.

In some embodiments where it is desirable to be able to monitor the contents of virtual address space, manipulation of elements of the shadow page table can assist in detecting changes to the virtual address space, such as those caused by swapping pages in and out of physical memory.

Figure 3B:
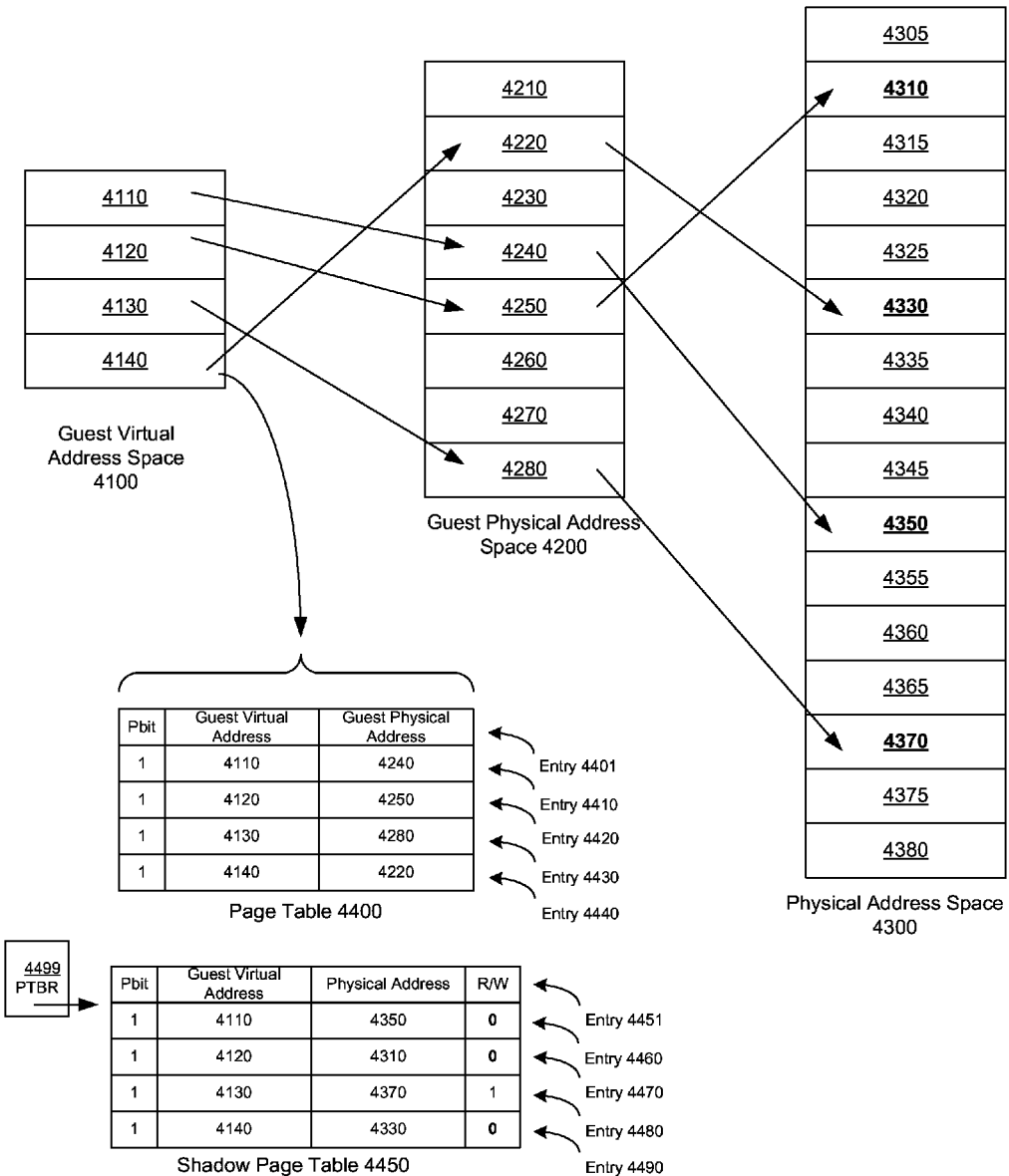
FIG. 3b depicts an exemplary mapping of virtual address space to physical address space, with modifications to facilitate monitoring virtual address space, in accordance with one embodiment.

For example, FIG. 3b again depicts virtual address space 4100, guest physical address space 4200, and physical address space 4300. Suppose there is some data structure, such as a process list, that is contained within virtual memory pages 4110 and 4120, and suppose some entity wants to monitor the contents of this data structure. To monitor the contents of this data structure in virtual address space 4100, two changes are made. First, the shadow page table entry that maps the memory page containing the page table 4400 is identified and the read/write flag for this entry in shadow page table 4450 is modified, to detect modification of entries 4410 through 4440. In the example of FIG. 3, the shadow page table entry that maps the memory page containing the page table 4400 is entry 4490. Thus, the read/write flag for entry 4490 is cleared to 0 to detect any changes to guest page table 4400. As described above, in connection with FIG. 2, the page table 4400 may actually comprise multiple memory pages, and possibly multiple levels of page table pages. Accordingly, multiple shadow page table entries mapping multiple memory pages in which the page table 4400 is stored may be modified to prevent modification of entries in the page table 4400. However, if memory pages contain page table pages that do not affect the data structure, then the entries mapping these memory pages do not need to be modified in this manner. Once the shadow page table entry is modified, if any attempt is made to modify an entry in page table 4400, a page fault will be generated, e.g., by the host machine's memory controller. The virtualization software can generally handle such a page fault without invoking a page fault handling routine in the guest OS, thus effectively hiding the page fault from the guest operating system. As is explained in greater detail below, a monitoring agent can detect these hidden page faults, and use them to identify pages that are being affected, such as pages that are being swapped in or out of guest physical address space 4200 by the guest operating system. Moreover, a detection process can be used to trigger certain other actions, such as creating copies of pages before they are swapped out or after they are swapped in.

Similarly, the contents of memory pages that actually contain the data structure can be monitored. Mappings for such memory pages are flagged as "read only" in the shadow page table. Attempts to modify the contents of these pages will generate a page fault, which is hidden from the guest OS. For example, once it is determined that the data structure is contained within memory pages 4110 and 4120, corresponding physical address space 4300 locations (e.g., addresses 4350 and 4310), can be monitored by clearing the read/write flags to 0 in entries 4460 and 4470 corresponding to those locations in shadow page table 4450.

As mentioned above, embodiments of this invention may be used to monitor a variety of data structures in a VM. To monitor a general data structure in a VM, one or more virtual memory pages in which the data structure is stored are identified. Changes to these memory pages are monitored. For example, write traces may be placed on the memory pages containing the data structure by modifying one or more shadow page table entries that map these virtual memory pages to physical memory pages. These write traces cause hidden page faults upon attempts to modify the memory pages containing the data structure. In addition, changes to guest page table pages that may affect the data structure are also monitored. For example, write traces may be placed on guest page table page(s) that map the virtual memory pages containing the data structure to guest physical memory. In this manner, virtualization software can be notified of any attempt to modify the data structure itself or any attempt to modify any entries in the guest page table that are used to map the virtual memory page containing the data structure to guest physical memory. Thus, in particular, the virtualization software will be notified if the guest OS attempts to swap in or out a guest physical memory page containing part of the data structure.

Figure 3C:
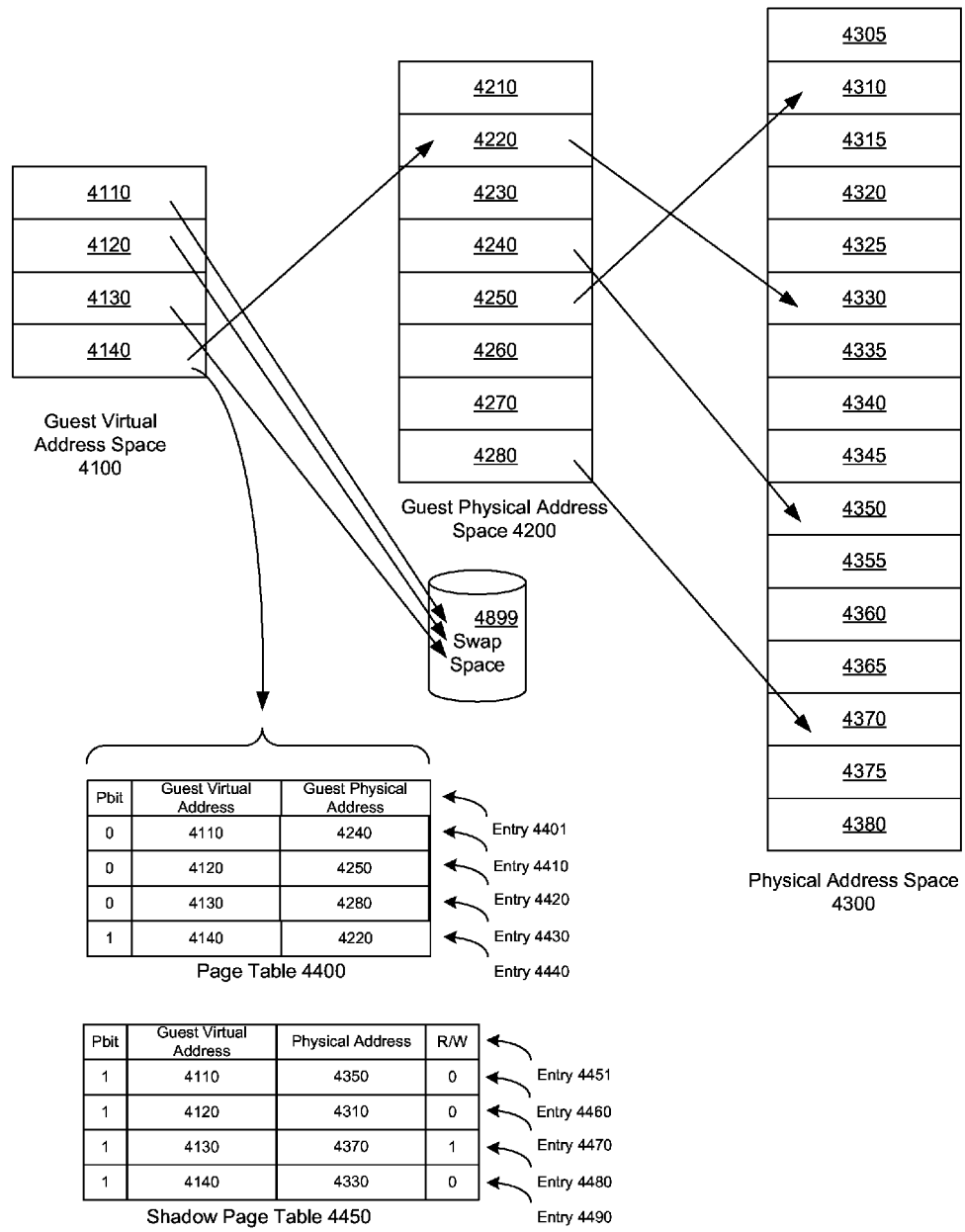
FIG. 3c depicts a swapping out of virtual memory pages, which is detected by modifications to the corresponding shadow page table, in accordance with one embodiment.

In some embodiments, once monitoring of a particular data structure in a virtual address space has begun, changes affecting that data structure will be identified, and may trigger certain other actions. FIG. 3c illustrates an example. Guest virtual address space 4100 is associated with a particular process executing on a virtual machine, controlled by a guest operating system. At the time depicted in FIG. 3c, the guest operating system has swapped out several pages associated with guest virtual address space 4100. This frees up additional portions of guest physical address space 4200 for use by a different process. The guest operating system makes appropriate changes to page table 4400 by changing the present bit for entries 4410, 4420, and 4430. The guest operating system also writes pages 4110, 4120, and 4130 to locations within swap space 4899.

However, because the guest operating system is executing in a virtualized environment, changes made to page table 4400 are mirrored by shadow page table 4450. Shadow page table 4450 is used by the host system to control physical address space 4300. Because the monitored data structure is contained in virtual memory pages 4110 and 4120, entries 4460 and 4470 in shadow page table 4450 were marked as read only. Entry 4490 was also marked as read only because it maps the guest page table 4400. Attempts to modify entries in guest page table 4400 produce a page fault because the guest page table is marked as read only by means of entry 4490, and attempts to modify the memory pages containing the data structure produce a page fault because the entries mapping these pages are marked as read only. As is explored in greater detail below, some embodiments utilize a monitoring agent which tracks these page faults, and uses them to identify pages relevant to a monitored data structure which are being modified. In one such embodiment, when the monitoring agent detects such a hidden page fault, it creates a copy of the page in physical memory corresponding to the location in guest physical memory being modified by the guest operating system before allowing the modification.

Monitoring State Machine

As discussed in some detail above, some embodiments utilize a monitoring agent or state machine, e.g., executing within the virtualization software or hypervisor, to facilitate monitoring of virtual address spaces belonging to virtual machines. While the nature and functionality of such an agent may vary across different embodiments, many embodiments share certain common functionality.

Figure 4:
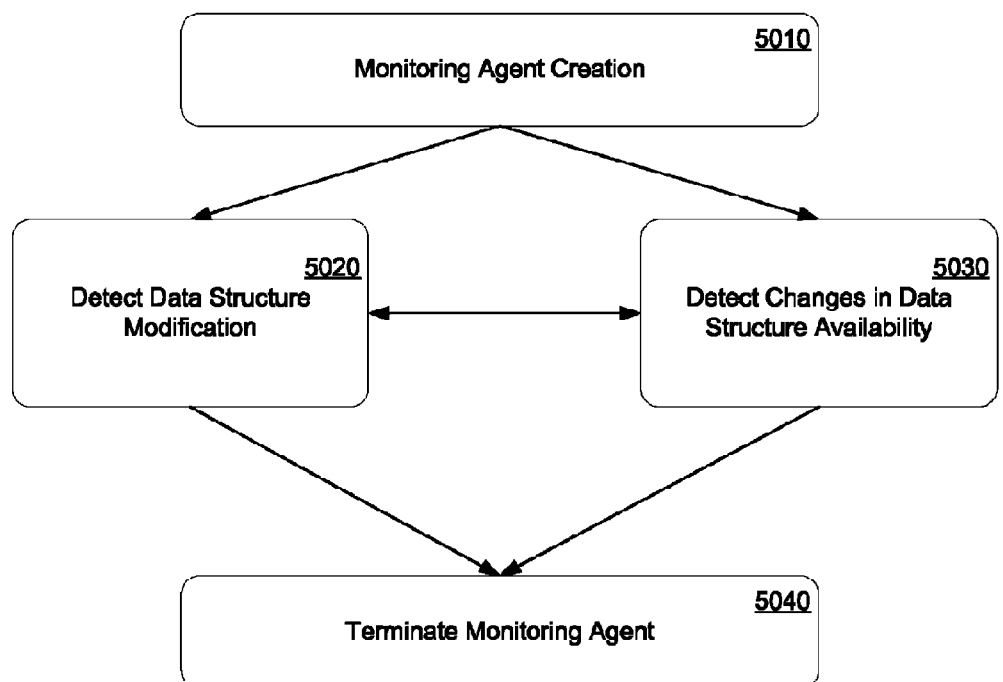
FIG. 4 is a flowchart depicting the interrelationship between transitions in a monitoring state machine, in accordance with one embodiment.

With reference now to FIG. 4, flowchart 5000 depicts the interrelationship between several transitions in a state machine, in accordance with one embodiment. While flowchart 5000 and the accompanying description describe explicit actions and behaviors, it is understood that embodiments are well suited to applications involving additional, fewer, or different transitions between many different states.

With reference to element 5010, the monitoring agent or state machine is initialized by a creation transition. At this stage, the virtualization infrastructure will decide that a particular data structure should be available. With reference to the preceding figures, a monitoring system executing within the virtualization software on the host system decides that a data structure within virtual address space 4100 should be monitored. This can be initiated, for example, as a result of a notification provided by a security agent running in a separate virtual machine. The monitoring system would then create a new monitoring agent or state machine to monitor the data structure and the related data structures, such as page table 4400.

In some embodiments, creation of the monitoring agent may trigger the creation of a shadow data structure or other data storage mechanism to retain information about the contents of the primary data structure to be monitored. For example, a shadow data structure may be maintained including a copy of some or all of the contents of the primary data structure. In other embodiments, a shadow data structure may already exist for the data structure of interest, as part of normal virtualization operations. For example, the data structure to be monitored may be an entire virtual address space, such as virtual address space 4100. In which case, shadow page table 4450 may comprise the shadow data structure. In one such case, the monitoring agent may perform certain actions to facilitate monitoring the monitored data structure. It may mark certain entries in the shadow page table as read only to trigger page faults when a change occurs in the guest page table that may affect the monitored data structure. It may also monitor memory pages in the physical address space containing the monitored data structure to detect changes, e.g., by marking those pages read-only in the shadow page table, and detecting page faults generated when attempts are made to write to those memory pages.

In some embodiments, the creation transition may be triggered by the use of operation specific knowledge combined with execution instrumentation. For example, sufficient knowledge of the guest operating system may allow the virtualization infrastructure to know that a particular instruction at a particular virtual address indicates the creation of a process which should be monitored.

With reference now to element 5020, the monitoring agent detects updates performed on the monitored data structure, where the updates may be made by the process, the guest operating system or another process, for example. In one embodiment, changes made to a data structure can be detected by marking entries in the shadow page table that map to the memory page(s) containing the data structure as read only. For example, if the data structure to be monitored is contained in virtual memory page 4110, changes to the data structure can be monitored by marking entry 4460 as read only, so that changes made to the data structure will result in hidden page faults. The monitoring agent can use these hidden page faults to detect changes made to the monitored data structure.

Further, in some embodiments, an update transition can occur when specific operating system or application knowledge allows the virtualization infrastructure to detect a call to a function which is known to modify the data structure. Obtaining such knowledge may require experimentation, e.g., to determine which memory locations are accessed by guest software under specific conditions, or detailed specifications for the guest software, or some combination of both.

For example, if a monitoring system has sufficient knowledge of the guest software, it may be possible to detect execution of a particular process or function call which will result in modification of a monitored page within the machine memory. If only a particular function call is allowed to access or modify a particular location in memory, modifications of that location indicate that that function call has been invoked. If the monitoring system has sufficient knowledge about the guest software, it may be able to conclude what impact that function call will have on a monitored data structure or monitored memory.

With reference now to element 5030, the monitoring agent detects changes in data structure availability. For example, memory page(s) containing the monitored data structure may be swapped in or out of memory. In addition, page table page(s) needed to map the memory pages containing the data structure may be swapped in or out of memory. In cases where the monitored data structure is an entire virtual address space, the page table corresponding to the monitored virtual address space may itself be swapped in or out of memory. In some embodiments, linear tracing is utilized to monitor the availability of a hierarchy of page tables, as well as monitoring a particular page of interest. Such functionality was described in greater detail above, with reference to FIG. 2. For example, if page 3400 is being monitored, and page table 3300 was swapped out of guest physical memory by the guest operating system, entry 3220 of page table 3200 will indicate that page table 3300 is currently not present. The monitoring agent should continue to monitor entry 3220 for changes in the availability of page table 3300.

With reference now to element 5040, the monitoring agent should terminate under certain conditions. For example, if the monitored data structure has been released, freed, or destroyed, or if the related process or application has been terminated, the monitoring agent should similarly terminate. In some embodiments, a termination transition will occur whenever one of a number of stopping conditions occurs. For example, using specific operating system knowledge, the virtualization infrastructure may detect function call termination, thread termination, process termination, operating system crash, or operating system reboot. Similarly, if the virtual machine is powered off or reset, the monitoring agent should terminate. In other embodiments, other stopping conditions may apply.

Examining the Virtual Address Space of a Suspended Virtual Machine

As discussed previously, some embodiments of the present invention are well suited to enabling applications running outside a virtual machine to examine the contents of virtual address space of the virtual machine. In particular, several such embodiments allow a security service, such as an antivirus or anti-malware application, running in a separate virtual machine to examine the contents of a monitored virtual machine.

One application of the present invention allows virtual address space of a monitored virtual machine to be scanned while the virtual machine is in a suspended state. Such a suspend/scan operation may be regularly scheduled, triggered by aberrant behavior of the monitored virtual machine, or triggered upon detection of some other known event. By providing an API in the virtualization software, a security service can be made aware of the contents of the guest virtual address space associated with processes within the monitored virtual machine and can thereby access necessary locations in physical memory or machine storage to examine those contents.

Figure 5A:
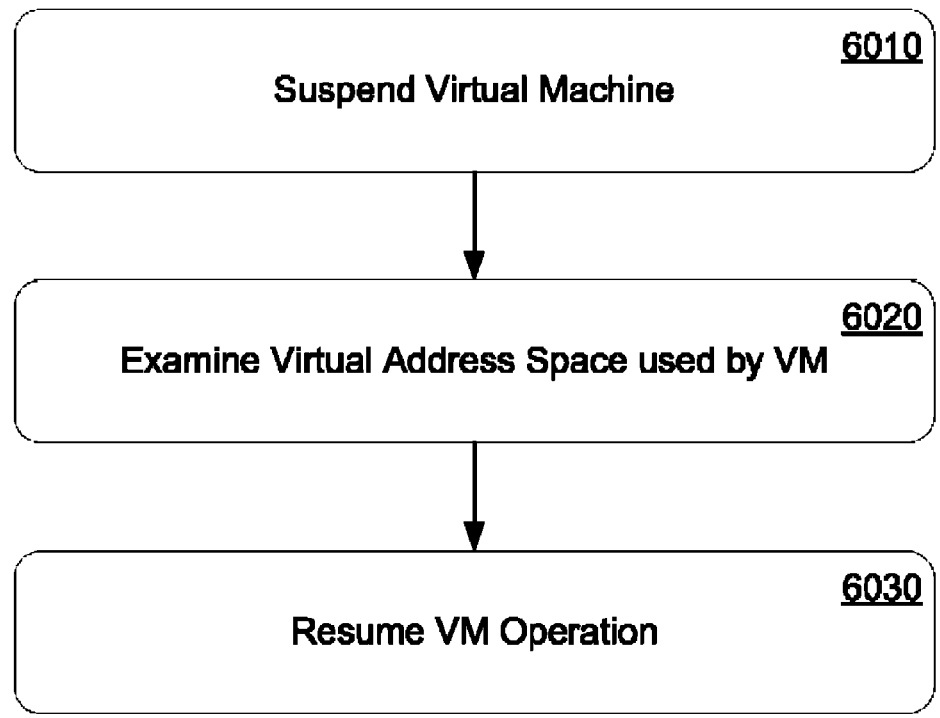
FIG. 5a is a flowchart of a method of examining the virtual address space associated with a suspended virtual machine, in accordance with one embodiment.

With reference now to FIG. 5a, a flowchart 6000 of a method of examining virtual address space associated with a suspended virtual machine is depicted, in accordance with one embodiment. Although specific steps are disclosed in flowchart 6000, such steps are exemplary. Embodiments of the present invention are well suited to performing various other (additional) steps or variations of steps recited in flowchart 6000. It is appreciated that steps in flowchart 6000 may be performed in an order different than presented, and that not all steps in flowchart 6000 may be performed.

With reference now to step 6010, the virtual machine is put into a suspended state. As noted previously, such a suspend operation may be instituted according to a regular scan schedule, or in response to a detected trigger event, such as observed aberrant behavior of a monitored virtual machine. Alternatively, a scan may run at a time when a virtual machine is in a suspended state (e.g., in preparation for virtual machine migration). In other embodiments, other methods of instituting a suspended state for a monitored virtual machine may be utilized.

With reference now to step 6020, the virtual address space associated with the virtual machine is examined. In different embodiments, different methods are utilized for examining virtual address space associated with the virtual machine. One such method is described below, with reference to FIG. 5b. Also, the nature of examination may vary, across different applications. For example, an application may scan the guest virtual address space of the virtual machine to perform an antivirus or anti-malware check, to determine resource utilization of the virtual machine, or to perform some other function.

With reference now to step 6030, the virtual machine resumes operation. In some embodiments, the virtual machine resumes functioning, after the examination of the virtual address space is concluded successfully. In other embodiments, if the examination reveals a problem (e.g., a virus), the virtual machine may not resume ordinary operation.

As noted above, some embodiments incorporate a method enabling examination of virtual address space associated with a given virtual machine. In particular, some embodiments of the present invention modify virtualization software executing on a host system (e.g., by adding a monitoring system to the hypervisor). This monitoring system tracks the contents of virtual address space of some or all processes executing on the virtual machine to allow examination of those contents. Moreover, this monitoring system allows such examination even if memory manipulation operations of the guest operating system are not transparent from outside the monitored virtual machine.

Figure 5B:
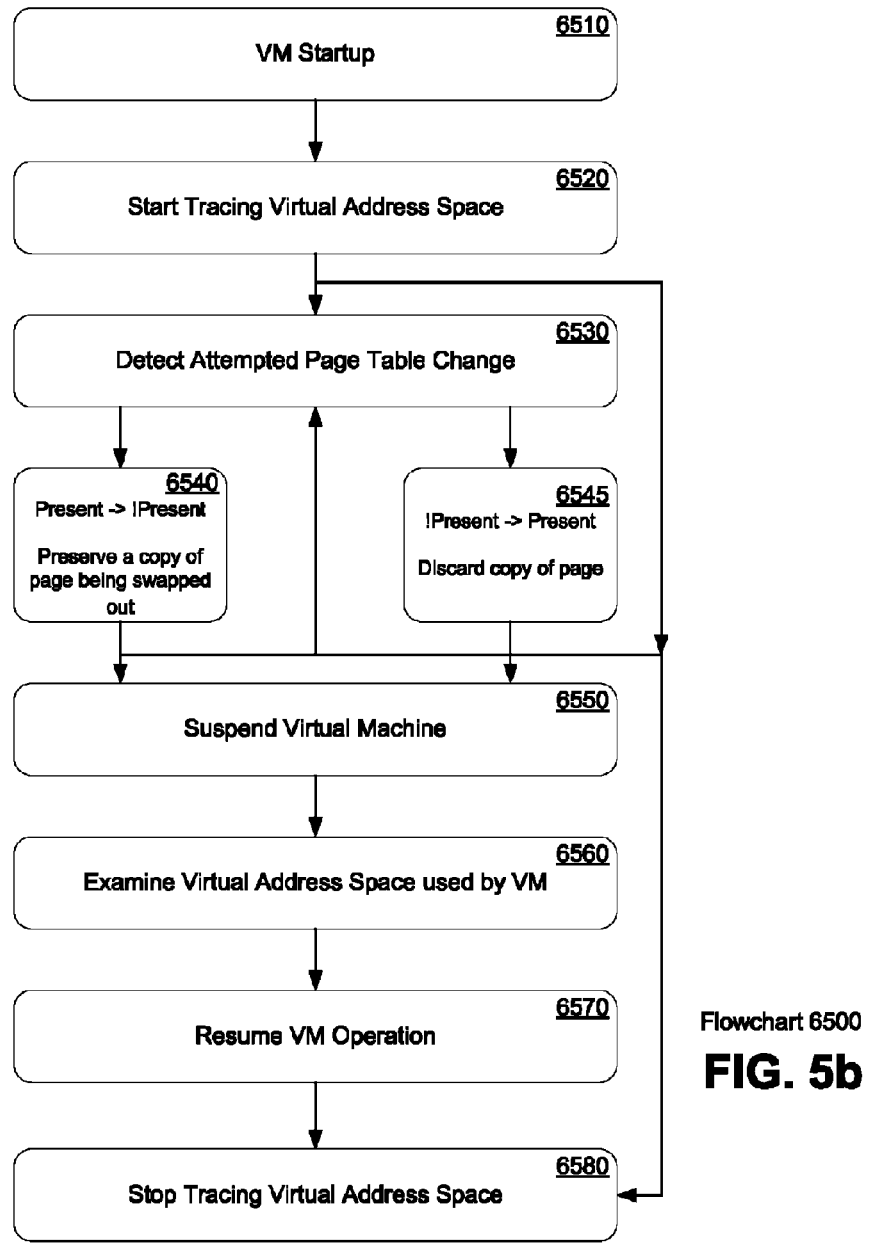
FIG. 5b is a flowchart of a method of monitoring the state of the virtual address space of a process in a virtual machine, in accordance with one embodiment.

With reference now to FIG. 5b, flowchart 6500 of a method of monitoring the state of virtual address space of a process in a virtual machine is depicted, in accordance with one embodiment. Although specific steps are disclosed in flowchart 6500, such steps are exemplary. That is, embodiments of the present invention are well suited to performing various other (additional) steps or variations of the steps recited in flowchart 6500. It is appreciated that steps in flowchart 6500 may be performed in an order different than presented, and that not all steps in flowchart 6500 may be performed.

With reference to step 6510, a virtual machine starts up. In some embodiments, when the virtual machine is powered on, or particularly when a guest operating system for that virtual machine begins to function, the controlling virtualization software creates shadow page tables to minor page tables created by the guest operating system. As discussed previously, these shadow page tables allow translation between guest physical address space being apportioned by the guest operating system and physical address space corresponding to the host system's hardware.

With reference now to step 6520, virtual address space in the virtual machine is traced, where the traced virtual address space may be the entire virtual address space of one or more processes, or that portion of a virtual address space containing a monitored data structure. In some embodiments, the virtualization software, or a monitoring system within the virtualization software, begins tracing virtual address space corresponding to one or more processes, function calls, or applications being run on the virtual machine. In different scenarios, tracing the virtual address space may involve different actions. For example, tracing the virtual address space associated with the program may involve disabling write access to entries in a shadow page table associated with that virtual address space. Attempts to modify the memory pages mapped by those shadow page table entries would therefore trigger page faults, which would be hidden from the virtual machine.

With reference now to step 6530, an attempted change to a monitored page table is detected. If, for example, a page fault is triggered by an attempt to modify a read only entry in the shadow page table, the virtualization software, or a monitoring system within the virtualization software, will detect the page fault. Depending upon the nature of the intended change, different actions may result.

With reference to step 6540, if a portion of the monitored virtual address space is to be swapped out, a copy of that portion is retained. If the detected change attempts to modify the present bit of an entry in the shadow page table (e.g., from "present" to "not present"), the guest operating system may be attempting to swap that page out of guest physical memory, and into storage. As such, a copy of the swapped out page should be retained, to allow examination of that portion of the monitored virtual address space.

With reference to FIG. 3c, the guest operating system swaps page 4120 of guest virtual address space 4100 out of guest physical address space 4200 and into swap space 4899. Page table 4400, and specifically entry 4420, is modified to change the present bit corresponding to page 4120. Because the shadow page table entry 4490 containing the mapping to the guest page table 4400 is marked as read only, any write to the guest page table 4400 generates a hidden page fault. Thus, the change to the present bit in entry 4420 causes a page fault. The virtualization software for the host machine will detect this page fault, and a monitoring system running on the virtualization software will make a copy of page 4120 (e.g., from physical address 4310); this copy may be stored, in order to facilitate a complete examination of virtual address space 4100, even though a portion of virtual address space 4100 has been swapped out. The virtualization software can then allow the modification to guest page table 4400.

With reference now to step 6545, if a portion of the monitored virtual address space is to be swapped in, any existing copies of that portion may be discarded. For example, if a page corresponding to the monitored virtual address space was previously swapped out, when that page is swapped back in, the copy created when it was swapped out can be discarded. If the detected change attempts to modify the present bit of an entry in the guest page table (e.g., from "not present" to "present"), the guest operating system may be attempting to swap a page back in, e.g., write the contents of a page of virtual memory to a location in physical memory; the swapped-in page may or may not be written to the same physical address it was previously stored at. Alternatively, the guest operating system (or the monitored process) may be discarding the previous version of the page, and replacing its contents. In either scenario, the old copy of the swapped out page may be safely discarded. In some embodiments, before a copy is discarded, the stored copy is compared with the page being swapped in. These embodiments thereby provide additional protection against error or malicious attack, as pages are only swapped in to physical memory if they match the page which was previously swapped out. If the pages do not match, a monitoring event may be triggered, alerting the monitoring agent of the discrepancy.

In some embodiments, steps 6530 through 6545 may loop, so long as the virtual machine continues operating and the monitored virtual address space remains in use. In some situations, monitoring may begin and conclude without detecting any attempted page table changes, e.g., such as when the process being monitored is a short-lived function call, and is not preempted or interrupted. Moreover, in some situations, a process may be monitored, and changes occur in the monitored virtual address space, but the process may terminate without a scan being performed.

With reference now to step 6550, the virtual machine is put into a suspended state. As noted previously, such a suspend operation may be instituted according to a regular scan schedule, or in response to a detected trigger event, such as observed aberrant behavior of a monitored virtual machine. Alternatively, a scan may run at a time when a virtual machine is in a suspended state, e.g., in preparation for virtual machine migration. In other embodiments, other methods of instituting a suspended state for a monitored virtual machine may be utilized.

With reference now to step 6560, the virtual address space associated with the virtual machine is examined. In this embodiment, the examining entity, such as an antivirus scanner, examines both those portions of the virtual address space still resident in machine memory, and the copies of the portions of the virtual address space which have been swapped out of machine memory. A monitoring agent on the host may provide an interface for the examining entity, such as an API (Application Programming Interface), and indicate where copies of swapped pages may be located.

With reference now to step 6570, the virtual machine resumes operation. In some embodiments, the virtual machine resumes functioning, after the examination of the virtual address space is concluded successfully. In other embodiments, if the examination reveals a problem, e.g., a virus, the virtual machine may not resume ordinary operation.

With reference now to step 6580, tracing of the virtual address space stops. As noted previously, the monitoring agent should terminate under certain conditions. In different embodiments, different events may trigger the cessation of tracing. For example, if the related process has terminated, or if the monitored data structure, e.g., the page table, has been released or destroyed, or if the guest operating system shuts down, the monitoring agent should cease tracing the virtual address space. This step may also entail discarding any remaining copies of pages from the virtual address space, modifying the shadow page table to remove the read-only flags, or deleting the shadow page table.

Monitoring the Virtual Address Space of an Operating Virtual Machine

Another application of the present invention enables monitoring of the contents of the virtual address space of a monitored virtual machine, while the virtual machine is operating. This continued monitoring offers several advantages. First, security applications, such as antivirus and anti-malware programs, can monitor the operation of processes within the monitored virtual machine from outside the virtual machine. This can be accomplished from within a separate virtual machine on the same host, for example. Second, the virtualization software can monitor the operations of the virtual machine to better facilitate system call interception or other monitoring goals.

To monitor the virtual address space in use by any given program in a virtual machine while the virtual machine operates, a monitoring agent within the virtualization software should include several capabilities. First, the monitoring agent should include functionality to monitor a page table associated with virtual address space being monitored. Second, the monitoring agent should include functionality to monitor contents of physical (and machine) memory associated with that virtual address space. In different embodiments, the monitoring agent can be configured to provide notifications upon the occurrence of specified events. For example, if the contents of a given memory location being monitored change, the monitoring agent may be configured to send a notification event to a security program operating in another virtual machine.

Figure 6:
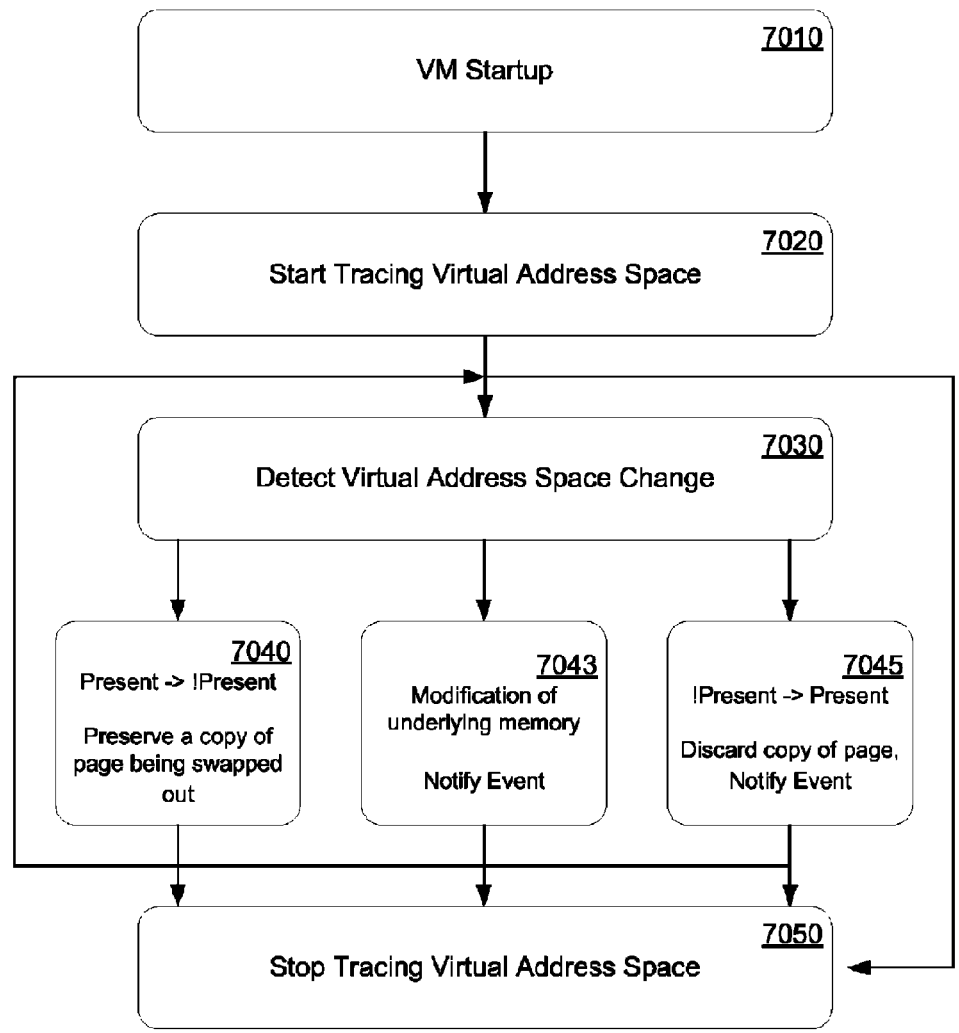
FIG. 6 is a flowchart of a method of monitoring the virtual address space of an operating virtual machine, in accordance with one embodiment.

With reference now to FIG. 6, showing flowchart 7000, a method of monitoring virtual address space of an operating virtual machine is described, in accordance with one embodiment. Although specific steps are disclosed in flowchart 7000, such steps are exemplary. That is, embodiments of the present invention are well suited to performing various other (additional) steps or variations of the steps recited in flowchart 7000. It is appreciated that the steps in flowchart 7000 may be performed in an order different than presented, and that not all of the steps in flowchart 7000 may be performed.

With reference now to step 7010, the virtual machine starts up. In some embodiments, when the virtual machine is powered on, or particularly when a guest operating system for that virtual machine begins to function, controlling virtualization software creates shadow page tables to mirror page tables created by the guest operating system. As discussed previously, these shadow page tables allow translation between guest physical address space being apportioned by the guest operating system, and physical address space corresponding to the host system's hardware.

With reference now to step 7020, virtual address space in the virtual machine is traced. In some embodiments, virtualization software, or a monitoring system within the virtualization software, begins tracing virtual address space corresponding to one or more processes, function calls, or applications being run on the virtual machine. In the depicted embodiment, tracing virtual address space involves disabling write access to entries in the guest page table associated with that virtual address space, such that attempts to modify the guest page table would trigger page faults. Tracing the virtual address space also includes monitoring memory associated with the virtual address space for changes, e.g., by monitoring physical address space locations corresponding to the virtual address space. In this manner, changes which modify the virtual address space being monitored are detected, even if those changes are not the result of modifications to the page table.

With reference now to step 7030, a change in the monitored virtual address space is detected. If, for example, a page fault is triggered by an attempt to modify a guest page table entry mapped by a read only entry in the shadow page table, the virtualization software, or a monitoring system within the virtualization software, will detect the page fault. Also, if an attempt is made to modify the contents of a memory location associated with the virtual address space being monitored, such an attempt would also be detected, as the shadow page table entries mapping those memory pages are also marked as read only.

With reference to step 7040, if a portion of the monitored virtual address space is to be swapped out, a copy of that portion is retained. If the detected change attempts to modify the present bit of an entry in the guest page table (e.g., from "present" to "not present"), the guest operating system may be attempting to swap that page out of physical memory, and into storage. As such, a copy of the swapped out page should be retained, to allow examination of that portion of the monitored virtual address space.

With reference to step 7043, if the contents of a monitored location in memory associated with the monitored virtual address space change, a notification event is processed. In some embodiments, portions of the guest physical memory or machine memory associated with the monitored virtual address space can be monitored for changes. In different scenarios, different amounts of memory may be monitored; for example, only a specific portion of a memory page may need to be monitored, to detect specific actions. In one embodiment, a trace is put on a full page. If a change is made to the monitored page, a monitoring agent or state machine executing within the virtualization software can examine the portion of interest for changes, and issue a notification event to an interested entity (e.g., a security program executing in another virtual machine on the host system).

With reference to step 7045, if a portion of the monitored virtual address space is to be swapped in, any existing copies of that portion may be discarded. For example, if a page corresponding to the monitored virtual address space was previously swapped out, when that page is swapped back in, the copy created when it was swapped out can be discarded. If the detected change attempts to modify the present bit of an entry in the guest page table, the guest operating system may be attempting to swap a page back in. Alternatively, the guest operating system (or the monitored process) may be discarding the previous version of the page, and replacing its contents. In either scenario, the old copy of the swapped out page may be safely discarded. In some embodiments, before a copy is discarded, the stored copy is compared with the page being swapped in. These embodiments thereby provide additional protection against error or malicious attack, as pages are only swapped in to physical memory if they match the page which was previously swapped out. If the pages do not match, a notification event may be triggered, alerting the monitoring agent of the discrepancy.

Moreover, in some embodiments, a notification event can be triggered by changing the status of the present bit on an entry in the guest page table. In some situations, a monitoring program should be informed when an entry in the guest page table is marked as being present, e.g., to detect attempts to insert malicious instructions into the virtual address space being monitored.

Figure 7:
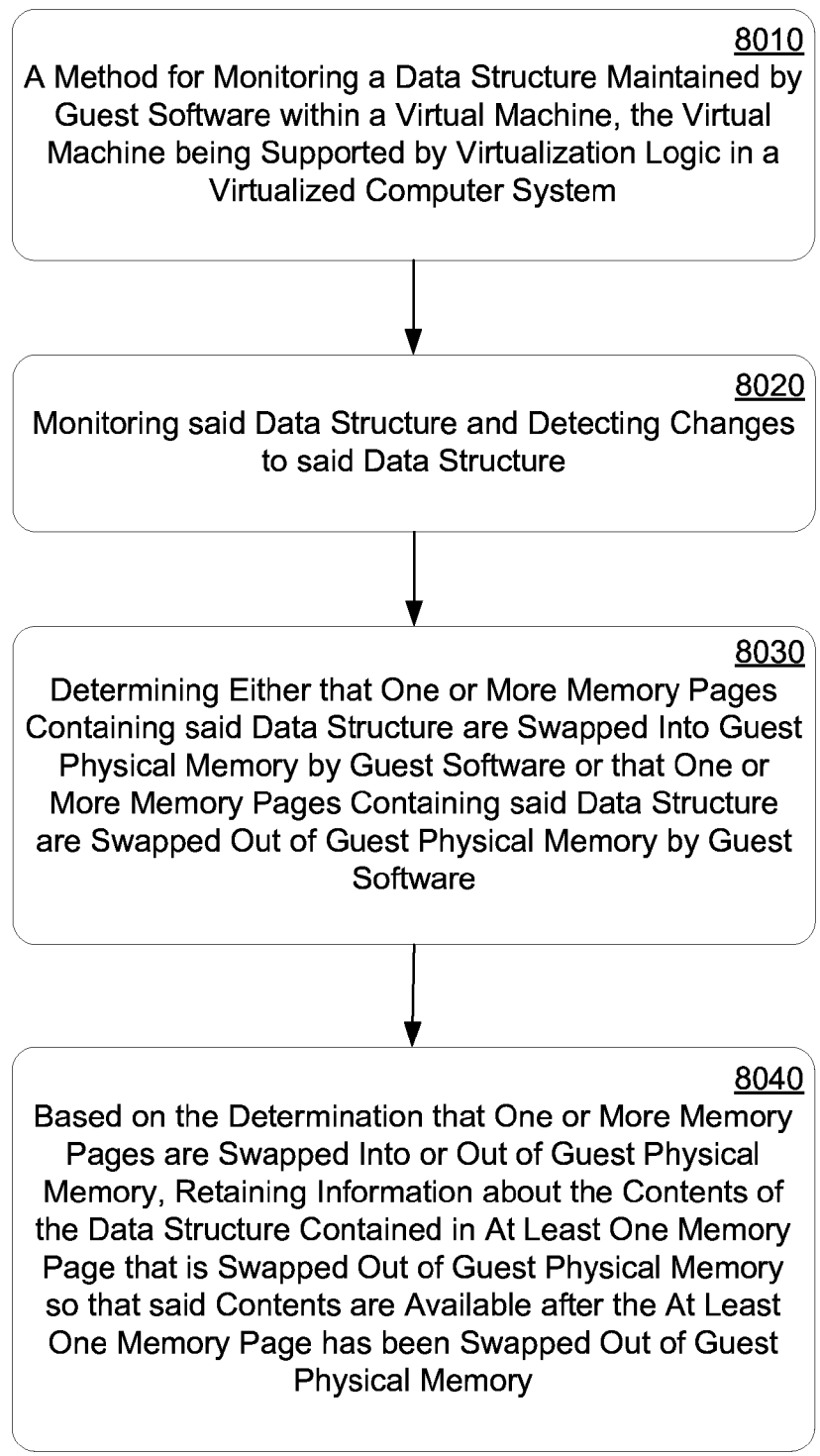
FIG. 7 is a flowchart of a method for monitoring a data structure maintained by guest software within a virtual machine, the virtual machine being supported by virtualization logic in a virtualized computer system, in accordance with one embodiment.

With reference now to FIG. 7, showing flowchart 8000, a method is illustrated, beginning at step 8010, for monitoring a data structure maintained by guest software within a virtual machine, the virtual machine being supported by virtualization logic in a virtualized computer system. Step 8020 comprises monitoring said data structure and detecting changes to said data structure. Step 8030 comprises determining either that one or more memory pages containing said data structure are swapped into guest physical memory by guest software or that one or more memory pages containing said data structure are swapped out of guest physical memory by guest software. Step 8040 comprises, based on the determination that one or more memory pages are swapped into or out of guest physical memory, retaining information about the contents of the data structure contained in at least one memory page that is swapped out of guest physical memory so that said contents are available after the at least one memory page has been swapped out of guest physical memory.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for monitoring a data structure maintained by guest software within a virtual machine, the virtual machine being supported by virtualization logic in a virtualized computer system, the method comprising:
    monitoring said data structure and detecting changes to said data structure;
    determining either that one or more memory pages containing said data structure are swapped into guest physical memory by guest software or that one or more memory pages containing said data structure are swapped out of guest physical memory by guest software; and
    based on the determination that one or more memory pages are swapped into or out of guest physical memory, retaining information about the contents of the data structure contained in at least one memory page that is swapped out of guest physical memory so that said contents are available after the at least one memory page has been swapped out of guest physical memory.

2. The method of claim 1, wherein, upon detecting that a first memory page containing at least a portion of said data structure is to be swapped out of guest physical memory, copying said portion of said data structure prior to the swapping out of the first memory page and maintaining said copy of said portion while the first memory page remains swapped out of guest physical memory.

3. The method of claim 1, wherein, upon detecting that a first memory page containing at least a portion of said data structure is to be swapped into guest physical memory, copying said portion of said data structure after the first memory page is swapped into guest physical memory and maintaining said copy of said portion until after the first memory page is subsequently swapped out of guest physical memory.

4. The method of claim 1, wherein retaining information about the contents of the data structure comprises maintaining a shadow copy of at least a portion of the data structure.

5. The method of claim 1, wherein the monitoring of said data structure comprises placing a write trace on one or more memory pages containing said data structure.

6. The method of claim 1, wherein determining that one or more memory pages are swapped into or out of guest physical memory comprises placing a write trace on one or more memory pages containing a guest page table to detect a write to a guest page table entry involved in mapping virtual addresses for the data structure.

7. The method of claim 6, wherein determining that one or more memory pages are swapped into or out of guest physical memory comprises detecting a write to a guest page table entry involved in mapping virtual addresses for the data structure that changes a present bit in the entry.

8. A computer program product embodied in a computer readable medium, the computer program product performing a method for monitoring a data structure maintained by guest software within a virtual machine, the virtual machine being supported by virtualization logic in a virtualized computer system, the method comprising:

monitoring said data structure and detecting changes to said data structure;

determining either that one or more memory pages containing said data structure are swapped into guest physical memory by guest software or that one or more memory pages containing said data structure are swapped out of guest physical memory by guest software; and based on the determination that one or more memory pages are swapped into or out of guest physical memory, retaining information about the contents of the data structure contained in at least one memory page that is swapped out of guest physical memory so that said contents are available after the at least one memory page has been swapped out of guest physical memory.

9. The computer program product of claim 8, wherein, upon detecting that a first memory page containing at least a portion of said data structure is to be swapped out of guest physical memory, copying said portion of said data structure prior to the swapping out of the first memory page and maintaining said copy of said portion while the first memory page remains swapped out of guest physical memory.

10. The computer program product of claim 8, wherein, upon detecting that a first memory page containing at least a portion of said data structure is to be swapped into guest physical memory, copying said portion of said data structure after the first memory page is swapped into guest physical memory and maintaining said copy of said portion until after the first memory page is subsequently swapped out of guest physical memory.

11. The computer program product of claim 8, wherein retaining information about the contents of the data structure comprises maintaining a shadow copy of at least a portion of the data structure.

12. The computer program product of claim 8, wherein the monitoring of said data structure comprises placing a write trace on one or more memory pages containing said data structure.

13. The computer program product of claim 8, wherein determining that one or more memory pages are swapped into or out of guest physical memory comprises placing a write trace on one or more memory pages containing a guest page table to detect a write to a guest page table entry involved in mapping virtual addresses for the data structure.

14. The computer program product of claim 13, wherein determining that one or more memory pages are swapped into or out of guest physical memory comprises detecting a write to a guest page table entry involved in mapping virtual addresses for the data structure that changes a present bit in the entry.

15. A virtualized computer system comprising a physical computer system with virtualization software executing thereon, the virtualization software supporting operation of a virtual machine with guest software executing therein, the virtualized computer system further comprising computer program code, the computer program code performing a method for monitoring a data structure maintained by the guest software within the virtual machine, the method comprising:

monitoring said data structure and detecting changes to said data structure;

determining either that one or more memory pages containing said data structure are swapped into guest physical memory by guest software or that one or more memory pages containing said data structure are swapped out of guest physical memory by guest software; and based on the determination that one or more memory pages are swapped into or out of guest physical memory, retaining information about the contents of the data structure contained in at least one memory page that is swapped out of guest physical memory so that said contents are available after the at least one memory page has been swapped out of guest physical memory.

16. The virtualized computer system of claim 15, wherein, upon detecting that a first memory page containing at least a portion of said data structure is to be swapped out of guest physical memory, copying said portion of said data structure prior to the swapping out of the first memory page and maintaining said copy of said portion while the first memory page remains swapped out of guest physical memory.

17. The virtualized computer system of claim 15, wherein, upon detecting that a first memory page containing at least a portion of said data structure is to be swapped into guest physical memory, copying said portion of said data structure after the first memory page is swapped into guest physical memory and maintaining said copy of said portion until after the first memory page is subsequently swapped out of guest physical memory.

18. The virtualized computer system of claim 15, wherein retaining information about the contents of the data structure comprises maintaining a shadow copy of at least a portion of the data structure.

19. The virtualized computer system of claim 15, wherein the monitoring of said data structure comprises placing a write trace on one or more memory pages containing said data structure.

20. The virtualized computer system of claim 15, wherein determining that one or more memory pages are swapped into or out of guest physical memory comprises placing a write trace on one or more memory pages containing a guest page table to detect a write to a guest page table entry involved in mapping virtual addresses for the data structure.

21. The virtualized computer system of claim 20, wherein determining that one or more memory pages are swapped into or out of guest physical memory comprises detecting a write to a guest page table entry involved in mapping virtual addresses for the data structure that changes a present bit in the entry.

* * * * *